United States Patent
Loch et al.

(10) Patent No.: US 7,732,543 B2
(45) Date of Patent: Jun. 8, 2010

(54) SILOXANES AND SILANES CURED BY ORGANOBORANE AMINE COMPLEXES

(75) Inventors: Cheryl Lynn Loch, Ypsilanti, MI (US); Dongchan Ahn, Midland, MI (US); Nick Evan Shephard, Midland, MI (US); James Steven Tonge, Sanford, MI (US); Patricia Ann Olney, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 419 days.

(21) Appl. No.: 11/792,063

(22) PCT Filed: Dec. 13, 2005

(86) PCT No.: PCT/US2005/044948

§ 371 (c)(1),
(2), (4) Date: May 31, 2007

(87) PCT Pub. No.: WO2006/073696

PCT Pub. Date: Jul. 13, 2006

(65) Prior Publication Data

US 2007/0298223 A1    Dec. 27, 2007

Related U.S. Application Data

(60) Provisional application No. 60/641,360, filed on Jan. 4, 2005.

(51) Int. Cl.
C08F 4/52 (2006.01)

(52) U.S. Cl. .................. 526/196; 526/134; 526/141; 526/328; 526/178; 502/162; 502/200; 502/202; 564/8; 564/9

(58) Field of Classification Search ................ 526/196, 526/134, 141, 328, 178; 502/162, 200, 202; 564/8, 9
See application file for complete search history.

(56) References Cited

U.S. PATENT DOCUMENTS

| | | | |
|---|---|---|---|
| 2,676,182 A | 4/1954 | Daudt et al. | |
| 3,275,611 A | 9/1966 | Mottus et al. | |
| 4,584,355 A | 4/1986 | Blizzard et al. | |
| 4,585,836 A | 4/1986 | Homan et al. | |
| 4,591,622 A | 5/1986 | Blizzard et al. | |
| 5,160,928 A | 11/1992 | Rigat-Esselin et al. | |
| 5,310,835 A | 5/1994 | Skoultchi et al. | |
| 5,380,527 A | 1/1995 | Legrow et al. | |
| 5,539,070 A | 7/1996 | Zharov et al. | |
| 5,686,544 A | 11/1997 | Pocius | |
| 5,929,194 A | 7/1999 | Woo et al. | |
| 6,121,165 A | 9/2000 | Mackey et al. | |
| 6,361,716 B1 | 3/2002 | Kleyer et al. | |
| 6,403,697 B1 | 6/2002 | Mitsunaga et al. | |
| 6,509,423 B1 | 1/2003 | Zhu | |
| 6,534,581 B1 | 3/2003 | Kleyer et al. | |
| 6,620,515 B2 | 9/2003 | Feng et al. | |
| 6,706,831 B2 | 3/2004 | Sonnenschein et al. | |
| 6,762,260 B2 | 7/2004 | Sonnenschein et al. | |
| 6,777,512 B1 | 8/2004 | Sonnenschein et al. | |
| 6,806,330 B1 | 10/2004 | Sonnenschein et al. | |
| 2002/0028894 A1 | 3/2002 | Sonnenschein et al. | |
| 2003/0064256 A1 | 4/2003 | Sadvary et al. | |
| 2004/0010099 A1 | 1/2004 | Kneafsey et al. | |

FOREIGN PATENT DOCUMENTS

| | | | |
|---|---|---|---|
| WO | WO 2005/017005 A1 | 2/2005 | |
| WO | WO 2005/017006 A1 * | 2/2005 | |
| WO | WO 2005/044867 A1 | 5/2005 | |

OTHER PUBLICATIONS

Soderquiest, John A., and Brown, Herbert C., "Convenient and Regiospecific Route to Functionalized Organosilanes through the Hydroboration of Alkenylsilanes," J. of Org. Chem., 1980, vol. 45, pp. 3571-3578.

* cited by examiner

*Primary Examiner*—Ling-Siu Choi
(74) *Attorney, Agent, or Firm*—Patricia M. Scaduto

(57) ABSTRACT

Curable compositions contain (i) a free radical polymerizable organosilicon monomer, oligomer or polymer; (ii) an organoborane amine complex; optionally (iii) an amine reactive compound having amine reactive groups; and optionally (iv) a component capable of generating a gas when mixed with a compound bearing active hydrogen and a catalyst. The curable compositions can be used as a rubber, tape, adhesive, foam, pressure sensitive adhesive, protective coating, thin film, thermoplastic monolithic molded part, thermosetting monolithic molded part, sealant, gasket, seal, or o-ring, die attachment adhesive, lid sealant, encapsulant, potting compound, or conformal coating. The compositions can also be used in composite articles of manufacture such as integrally bonded device including electrical and electronic connectors and scuba diving masks, in which substrates are coated or bonded together with the composition and cured.

22 Claims, No Drawings

SILOXANES AND SILANES CURED BY ORGANOBORANE AMINE COMPLEXES

CROSS REFERENCE TO RELATED APPLICATIONS

This application is a U.S. national stage filing under 35 U.S.C. 371 of PCT Application No. PCT/US05/044948 filed on 13 Dec. 2005, currently pending, which claims the benefit of U.S. Provisional Patent Application No. 60/641,360 filed 4 Jan. 2005 under 35 U.S.C. 119 (e). PCT Application No. PCT/US05/044948 and U.S. Provisional Patent Application No. 60/641,360 are hereby incorporated by reference.

DESCRIPTION

This invention is directed to curable compositions containing free radical polymerizable organosilicon monomers, oligomers, or polymers, that cure in the presence of an organoborane amine complex activated by heat; or that cure by combining the free radical polymerizable organosilicon monomers, oligomers, or polymers, and the organoborane amine complex, with an amine reactive compound in an oxygen containing environment; to form cured articles of manufacture.

The invention is also directed to a composite article that includes the curable organosilicon composition and at least one substrate. Curable is defined herein as being able to undergo curing, that is defined as a chemical reaction such as polymerization or crosslinking that results in an increase in average molecular weight of the polymerizable component, such that the composition thickens or hardens. The curable organosilicon composition has improved shelf stability and improved cure properties at room temperature. The curable organosilicon composition contains (i) a free radical polymerizable organosilicon monomer, oligomer or polymer; (ii) an organoborane amine complex; and optionally (iii) an amine reactive compound.

In addition, the invention is directed to methods of making composite articles wherein the curable organosilicon composition is in the form of an adhesive that can be cured at a temperature lower than temperatures previously employed, such that the substrate and the organosilicon composition bond together at lower temperatures to make the composite articles.

Curable organosilicon compositions are known in the art including the use of addition (i.e., hydrosilylation) curable compositions because volatile byproducts are not generated during reactions to cure such compositions. Typically, these compositions contain one or more polydiorganosiloxanes having at least two alkenyl groups per molecule, an organohydrogen polysiloxane having an average of at least two silicon bonded hydrogen atoms, and a hydrosilylation catalyst. An example of such an addition curable composition is a silicone elastomer that crosslinks upon cure by hydrosilylation, and that is used in the manufacture of molded rubber parts; release coatings; pressure sensitive adhesives; cure-in-place adhesives for the assembly of appliances or automotive parts and as coatings or encapsulants for the protection and/or passivation of electronic circuit boards.

A known limitation of these hydrosilylation curable compositions, however, is the susceptibility of hydrosilylation catalysts such as platinum compounds to become poisoned or inhibited by even small quantities of compounds containing nitrogen, phosphorous, sulfur, tin, or arsenic, that strongly associate with the hydrosilylation catalyst. This susceptibility leads to improperly formed or uncured products, and limits the type and concentration of additives that can be used to modify such hydrosilylation curable compositions. In addition, the presence of active hydrogen as an alcohol, acid, and even water, can react with the organohydrogen polysiloxane to create undesirable side reactions. Therefore, additives and impurities containing hydrosilylation catalyst inhibiting groups that may be present during the curing process tend to reduce the cure rate or the physical properties of the hydrosilylation curable composition. In cases where the inhibiting groups are present on the surface of a substrate, the development of adhesion between the substrate and the hydrosilylation curable composition may require substantially higher cure temperatures than usual. In severe cases, adhesion and cure may even be prevented altogether by the presence of inhibiting groups.

The use of organic peroxides for curing organosilicon compositions is also known. Peroxide curable compositions do not require a platinum group containing catalyst, and therefore such compositions are less susceptible to cure inhibition by small quantities of compounds containing nitrogen, phosphorous, sulfur, or arsenic. While compositions containing organic peroxides are capable of initiating polymerization or cure at low temperatures, typically they suffer from poor shelf life due to their inherent thermal instability. Further, curable compositions based on organic peroxides may be strongly inhibited by oxygen, and therefore require processing in an inert environment, or tend to generate undesirable decomposition by-products.

Organoborane amine complexes are also known. For example, organoborane amine complexes used for the polymerization of acrylic monomers is described in U.S. Pat. No. 3,275,611 Sep. 27, 1966). Organoboron compounds useful for polymerization such as trialkylboranes by themselves are pyrophoric in the presence of oxygen, so preformed complexes between organoboron compounds and amine compounds are noted to have the benefit of imparting improved stability to organoboron compounds such as trialkylboranes.

Recent modifications on the structure of organoborane amine complexes are described in U.S. Pat. No. 6,706,831 (Mar. 16, 2004), as well as their use in acrylate based adhesives. The combination of alkylborane amine complexes with amine reactive decomplexing agents to initiate polymerization of acrylic adhesives at room temperature, is also described. Such compositions offer the advantage of rapid cure and adhesion to low energy plastics.

US Patent Application Publication 2004/0010099 (Jan. 15, 2004) discloses an alkylborane aziridine complex that can be used as a polymerization catalyst for polymerizable monomers such as difunctional or polyfunctional acrylates, methacrylates, or vinyl terminated resins including silicones resins and urethane resins, provided the monomers are included in a minor proportion, e.g. up to 20 percent, preferably up to 15 percent by weight based on the total weight of the composition. Even when included as a minor component, the composition does not offer the full advantages of an organopolysiloxane based matrix. For example, because oxygen is needed to initiate the cure reaction, an organopolysiloxane based matrix such as a polydimethylsiloxane (PDMS) polymer, allows more rapid deep section cures than comparable organic matrices, because of its improved oxygen permeability.

U.S. Pat. No. 6,777,512 (Aug. 17, 2004), referred to hereafter as the '512 patent, describes certain polymerizable silicone compositions containing (a) an organoborane amine complex, (b) one or more compounds having unsaturation capable of free radical polymerization, combined with (c) compounds having a siloxane backbone and reactive moieties capable of cure, and (d) a catalyst for curing the siloxane. Such compositions offer the advantage of forming addition curable products with good adhesion to low energy substrates without inhibition problems associated with hydrosilylation curable compositions. However, these hybrid compositions suffer from phase separation of the organic and siloxane phases, and therefore tend to be less flexible than the all siloxane containing matrices of this invention. Because the siloxane phase uses a second cure catalyst (d) which operates via a different reaction such as condensation or hydrosilylation, there can be competing reactions that introduce additional complexity to the task of controlling phase behavior and resulting properties of the compositions. Without component (d), the compositions described in the '512 patent would exhibit substantial unreacted material in the siloxane phase, since the aminoborane amine complex is not capable of curing at least one of the siloxane compounds present in the curable siloxanes component (c), such as a silicon hydride functional siloxane or an —OH functional siloxane. Further, the presence of an organic free radical polymerizable compound (b) such as an acrylic monomer in the '512 patent can also lead to reduced thermal stability in fully polymerized materials. Accordingly, the present invention differs from the '512 patent in that the compositions herein are entirely curable by the organoborane amine complex catalyst (ii). Furthermore, the present invention specifically includes a free radical polymerizable organosilicon monomer, oligomer, or polymer yet is free of any free radical polymerizable monomers, oligomers, or polymers that do not contain one or more silicon atoms.

Furthermore, because high temperatures are needed to develop adhesion with existing addition curable organosilicon compositions, the out-gassing of entrained volatile materials such as water, from either the substrate or from within the curable composition, leads to the formation of undesirable voids or bubbles in joints formed between the silicone based elastomer and the substrate to which it is applied. This problem is particularly acute with hygroscopic, polar polymeric compositions such as polyesters, polyamides, polyimides, and epoxy resins. To overcome the problem, the components used to make the compositions often require pre-drying that entails some additional process steps and drying equipment in manufacturing processes. Also, the curing temperatures needed for addition curing of organosilicon compositions exceed the thermal stability limits of some polymeric substrates and components mounted thereon.

While there exist other examples of external treatment methods for the surfaces of components such as application of a primer or exposure to high energy sources such as plasma, corona, or ultraviolet light, even these treatment methods require additional processing time, and/or costly equipment in manufacturing processes.

In contrast to the above, the invention herein involves the discovery of certain addition curable organosilicon compositions able to polymerize and/or crosslink rapidly even at low temperatures, yielding compositions offering unique physical properties attributed by organosilicon-based matrices with improved adhesion over conventional addition curable organosilicon compositions.

Due to deficiencies associated with addition curable compositions of the prior art noted above, there is a need for compositions that cure rapidly at lower temperatures and/or shorter times, while at the same time eliminating the need of pre-drying and external treatments of surfaces to which the compositions are applied.

Accordingly, the invention is directed to curable compositions containing (i) a free radical polymerizable organosilicon monomer, oligomer or polymer; (ii) an organoborane amine complex, and optionally (iii) an amine reactive compound. The free radical polymerizable organosilicon monomer, oligomer, or polymer is an organosilicon monomer, oligomer, or polymer containing unsaturation, and capable of undergoing free radical polymerization. The organoborane amine complex is a complex formed between an organoborane and an amine compound. The organoborane has the formula $BR''_3$ where R" represents linear, branched, aliphatic, or aromatic hydrocarbon groups containing 1-20 carbon atoms. The amine compound used to form the complex can be an organic amine or a silicon containing amine. The function of the amine reactive compound (iii) when included in the composition is to cause the organoborane amine complex to dissociate. Dissociation of the organoborane amine complex can be accomplished without the amine reactive compound (iii) if desired, by heating the curable composition to a temperature at which the organoborane amine complex dissociates.

The amine reactive compound (iii) can be a mineral acid, Lewis acid, carboxylic acid, carboxylic acid derivative, carboxylic acid metal salt, isocyanate, aldehyde, epoxide, acid chloride, or sulphonyl chloride. The amine reactive functional groups can be borne by organic molecules or organometallic compounds such as organosilanes, organopolysiloxanes, organotitanates, or organozirconates. The amine reactive compound can be monomeric, oligomeric, or polymeric. The amine reactive compound (iii) may contain free radical polymerizable groups such as acrylic acid or polyacrylic acid. In addition, the amine reactive compound (iii) can be attached to solid particles such as ground silica, precipitated silica, calcium carbonate, carbon black, carbon nanoparticles, silicon nanoparticles, barium sulfate, titanium dioxide, aluminum oxide, zinc oxide, boron nitride, silver, gold, platinum, palladium, and alloys thereof, or base metals such as nickel, aluminum, copper, and steel.

If porous or microporous foamed products are desired, the curable composition may also contain (iv) a component capable of generating a gas (a) when it's mixed with compounds bearing active hydrogen (b) and a catalyst (c). While the three components a-c are required for producing foamed products, one or more of them may already be present in some curable compositions. Component (a) can be a silicon hydride functional compound such as an organohydrogen polysiloxane, component (b) can be water, an alcohol, or a carboxylic acid, and component (c) can be platinum, a platinum group metal, tin, titanium, or zirconium.

The curable compositions can be used in the preparation of composite articles of manufacture with various substrates, when the substrates are coated or bonded together with the curable composition and cured. Such compositions and composite articles made therefrom can be used in a wide range of applications such as in the electronics, automobile, construction, sports and recreation, consumer products, and medical industries. These and other features of the invention will become apparent from a consideration of the description of the invention.

Curable compositions herein contain (i) a free radical polymerizable organosilicon monomer, oligomer, or polymer; (ii) an organoborane amine complex; and optionally (iii) an effective amount of an amine reactive compound having amine reactive groups. As previously noted, component (iii) should be capable of causing the organoborane amine complex (ii) to dissociate. In compositions not containing component (iii), those compositions can be heated to temperatures sufficient to cause the organoborane amine complex (ii) to dissociate.

These curable compositions offer rapid cure at low temperatures, particularly when component (iii) is included. When used as composite articles, the curable compositions can be applied to at least one surface of a substrate. When used to manufacture composite articles, the process can be conveniently carried out by bonding the curable composition to at least one surface of the substrate at significantly lower temperatures, i.e., typically at room temperature (RT) of 20-25° C./68-77° F., and in a shorter time.

The Free Radical Polymerizable Monomer, Oligomer, or Polymer (i)

Component (i) is an organosilicon compound and can be a single monomer, oligomer, polymer, or mixture, containing unsaturation, and capable of undergoing free radical polymerization. The compound selected depends on the use of the cured product, but it is generally selected from among organosilanes and organopolysiloxanes having an average of at least one free radical polymerizable moiety. The organosilicon compounds can be monomeric, oligomeric, polymeric, or they can include mixtures of monomers, and/or oligomers, and/or polymers. In many cases, it may be preferable to use mixtures of monomers, oligomers, or polymers to impart the desired combination of bulk and surface properties such as cure rate, modulus, and adhesion. Higher molecular weight versions of such free radical polymerizable compounds are sometimes referred to as macromonomers. The organosilicon compounds can contain monofunctional or multifunctional units in the free radical polymerizable group. This allows for polymerization to linear polymers, branched polymers or various architecture, copolymers of various architecture, or crosslinked polymer networks. The monomers and oligomers can be any monomer or oligomer used to prepare addition or condensation curable polymers, or monomers or oligomers used in other types of curing reactions provided they have at least one free radical polymerizable group.

Suitable organosilicon monomers include structures corresponding to the formula $R_nSi(OR')_{4-n}$ where n is 0-4, and where at least one of the R or R' groups contain a free radical polymerizable group. The R and R' groups can be independently hydrogen, a halogen atom, or an organic group such as alkyl groups, haloalkyl groups, aryl groups, haloaryl groups, alkenyl groups, alkynyl groups, acrylate, and methacrylate functional groups. The acrylic functional group prefixes acryloyl- and acryl- are used interchangeably throughout this document, as are methacryloyl- and methacryl-. The R and R' groups may also contain other organic functional groups such as glycidyl groups, amine groups, ether groups, cyanate ester groups, isocyano groups, ester groups, carboxylic acid groups, carboxylate salt groups, succinate groups, anhydride groups, mercapto groups, sulfide groups, azide groups, phosphonate groups, phosphine groups, masked isocyano groups, and hydroxyl groups.

Some examples of free radical polymerizable organosilicon monomers include 3-methacryloxypropyltrimethoxysilane, methacryloxymethyltrimethoxysilane, 3-methacryloxypropyltriethoxysilane, methacryloxymethyltriethoxysilane, 3-acryloxypropyltrimethoxysilane, acryloxymethyltrimethoxysilane, 3-methacryloxypropyltrimethylsilane, methacryloxymethyltrimethylsilane, 3-acryloxypropyltriethoxysilane, acryloxymethyltriethoxysilane, 3-acryloxylpropyltrimethylsilane, acryloxymethyltrimethylsilane, vinyltrimethoxysilane, allyltrimethoxysilane, 1-hexenyltrimethoxysilane, tetra-(allyloxysilane), tetra-(3-butenyl-1-oxy)silane, tri-(3-butenyl-1-oxy)methylsilane, di-(3-butenyl-1-oxy)dimethylsilane, and 3-butenyl-1-oxy trimethylsilane. Preferred free radical polymerizable moieties for these organosilicon compounds are aliphatic unsaturated groups in which the double bond is located at terminal positions, internal positions, or both positions relative to the functional group. The most preferred free radical polymerizable moiety for the organosilicon compounds are acrylate groups or methacrylate groups.

When the free radical polymerizable organosilicon compound is an organopolysiloxane monomer, oligomer, or polymer, the compound can be an organopolysiloxane having linear, branched, hyperbranched, or resinous structures. The compound can be homopolymeric or copolymeric. The free radical polymerizable moiety for the organopolysiloxane can be an unsaturated organic group such as an alkenyl group having 2-12 carbon atoms exemplified by vinyl, allyl, butenyl, and hexenyl groups. The unsaturated organic groups can also consist of alkynyl groups having 2-12 carbon atoms exemplified by ethynyl, propynyl, and butynyl groups. The unsaturated organic group can bear the free radical polymerizable group on oligomeric or polymeric polyethers such as allyloxypoly(oxyalkylene) groups and halogen substituted analogs thereof. The free radical polymerizable organic groups can contain acrylate or methacrylate functional groups exemplified by acryloxyalkyl groups such as 3-acryloxypropyl, 2-acryloxyethyl, acryloxymethyl, and methacryloxyalkyl groups such as 3-methacryloxypropyl, 2-methacryloxyethyl, and methacryloxymethyl. The unsaturated organic groups can be located at terminal positions, pendant positions, or both terminal and pendant positions relative to the polymer backbone. The preferred free radical polymerizable moiety for monomeric, oligomeric, and polymeric organosilicon compounds are acrylate and methacrylate groups.

Any remaining silicon bonded organic groups can be monovalent organic groups free of aliphatic unsaturation. The monovalent organic group can have 1-20 carbon atoms, preferably 1-10 carbon atoms, and is exemplified by alkyl groups such as methyl, ethyl, propyl, pentyl, octyl, undecyl, and octadecyl; cycloalkyl groups such as cyclohexyl; aryl groups such as phenyl, tolyl, xylyl, benzyl, and 2-phenylethyl; alkyloxypoly(oxylalkylene) groups such as propyloxypoly(oxyethylene), propyloxypoly(oxypropylene), propyloxy-poly(oxypropylene)-co-poly(oxyethylene) groups, halogen substituted versions thereof; cyanofunctional groups such as cyanoalkyl groups exemplified by cyanoethyl and cyanopropyl; carbazole groups such as 3-(N-carbazolyl)propyl; arylamino-functional groups such as 4-(N,N-diphenylamino) phenyl-3-propyl; and halogenated hydrocarbon groups such as 3,3,3-trifluoropropyl, 3-chloropropyl, dichlorophenyl, and 6,6,6,5,5,4,4,3,3-nonafluorohexyl.

The free radical polymerizable organosilicon compound can be a fluid having a viscosity of 0.001 Pa·s at 25° C. to a compound having the consistency of a gum. The free radical polymerizable organosilicon compound can also be a solid that becomes flowable at elevated temperatures or by application of shear.

Component (i) includes organopolysiloxane fluids having the formulae:

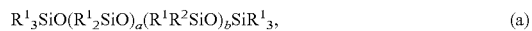

$$R^1{}_3SiO(R^1{}_2SiO)_a(R^1R^2SiO)_bSiR^1{}_3, \quad (a)$$

$$R^3{}_2R^4SiO(R^3{}_2SiO)_c(R^3R^4SiO)_dSiR^3{}_2R^4, \quad (b)$$

or (c) combinations of such fluids.

In Formula (a), a has an average value of zero to 20,000 and b has an average value of 1-20,000. Each $R^1$ group is independently a monovalent organic group. Suitable monovalent organic groups include acrylic functional groups such as acryloxymethyl, 3-acryloxypropyl, methacryloxymethyl, and 3-methacryloxypropyl groups; alkyl groups such as methyl, ethyl, propyl, and butyl groups; alkenyl groups such as vinyl, allyl, and butenyl groups; alkynyl groups such as ethynyl and propynyl groups; aromatic groups such as phenyl, tolyl, and xylyl groups; cyanoalkyl groups such as cyanoethyl and cyanopropyl groups; halogenated hydrocarbon groups such as 3,3,3-trifluoropropyl, 3-chloropropyl, dichlorophenyl, and 6,6,6,5,5,4,4,3,3-nonafluorohexyl groups; alkenyloxypoly(oxyalkyene) groups such as allyloxy(polyoxyethylene), allyloxypoly(oxypropylene), and allyloxy-poly(oxypropylene)-co-poly(oxyethylene) groups; alkyloxypoly(oxyalkyene) groups such as propyloxy(polyoxyethylene), propyloxypoly(oxypropylene), and propyloxy-poly(oxypropylene)-co-poly(oxyethylene) groups; halogen substituted alkyloxypoly(oxyalkyene) groups such as perfluoropropyloxy(polyoxyethylene), perfluoropropyloxypoly(oxypropylene), and perfluoropropyloxy-poly(oxypropylene)-co-poly(oxyethylene) groups; alkoxy groups such as methoxy, ethoxy, n-propoxy, isopropoxy, n-butoxy, and ethylhexyloxy groups; aminoalkyl groups such as aminomethyl, 2-aminoethyl, 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; epoxyalkyl groups such as glycidoxymethyl, 3-glycidoxypropyl, 2-(3,4,-epoxycyclohexyl)ethyl, and 5,6-epoxyhexyl groups; ester functional groups such as acetoxymethyl and benzoyloxypropyl groups; hydroxyl functional groups such as hydroxy and 2-hydroxyethyl groups; isocyanate and masked isocyanate functional groups such as isocyanatomethyl, 3-isocyanatopropyl, tris-3-propylisocyanurate, propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; carbazole groups such as 3-(N-carbazolyl)propyl; arylamino-functional groups such as 4-(N,N-diphenylamino)phenyl-3-propyl; carboxylic acid functional groups such as 3-carboxypropyl and 2-carboxyethyl groups; and metal salts of carboxylic acids such as the zinc, sodium, or potassium salts of 3-carboxypropyl and 2-carboxyethyl.

The $R^2$ group is independently an unsaturated monovalent organic group. $R^2$ is exemplified by alkenyl groups such as vinyl, allyl, and butenyl groups; alkynyl groups such as ethynyl and propynyl groups; and acrylic functional groups such as acryloxymethyl, 3-acryloxypropyl, methacryloxymethyl, and 3-methacryloxypropyl groups.

In Formula (b), c has an average value of zero to 20,000 and d has an average value of zero to 20,000. The $R^3$ groups can be the same as the $R^1$ groups noted above. Each $R^4$ is independently an unsaturated organic group. $R^4$ is exemplified by alkenyl groups such as vinyl, allyl, and butenyl groups; alkynyl groups such as ethynyl and propynyl groups; alkenyloxypoly(oxyalkyene) groups such as allyloxy(polyoxyethylene), allyloxypoly(oxypropylene), and allyloxy-poly(oxypropylene)-co-poly(oxyethylene) groups; and acrylic functional groups such as acryloxypropyl acryloxymethyl, 3-acryloxypropyl, methacryloxymethyl, and 3-methacryloxypropyl groups.

Some representative organopolysiloxane fluids suitable for use as component (i) include α, ω-methacryloxypropyldimethylsilyl terminated polydimethylsiloxane, α, ω-methacryloxymethyldimethylsilyl terminated polydimethylsiloxane, α, ω-acryloxypropyldimethylsilyl terminated polydimethylsiloxane, α, ω-acryloxymethyldimethylsilyl terminated polydimethylsiloxane, pendant acrylate and methacrylate functional polymers such as poly(acryloxypropyl-methylsiloxy) polydimethylsiloxane, poly(acryloxymethyl-methylsiloxy)polydimethylsiloxane, poly(methacryloxymethyl-methylsiloxy)polydimethylsiloxane, and poly(methacryloxypropyl-methylsiloxy)polydimethylsiloxane copolymers; and telechelic polydimethylsiloxanes having multiple acrylate or methacrylate functional groups such as compositions formed via Michael addition of multi-acrylate or multi-methacrylate monomers to amine terminated polydimethylsiloxanes. Such functionalizing reactions can be carried out a priori or in-situ.

It may be desirable to use a mixture of organopolysiloxane fluids differing in degree of functionality and/or the nature of the free radical polymerizable group. For example, the use of a tetra-functional telechelic polydimethylsiloxane prepared by Michael addition reaction of secondary amine terminated polydimethylsiloxane with two molar equivalents of trimethylolpropane tri-acrylate as component (i) of the composition, provides a much faster cure rate and a reduced sol content relative to di-functional methacryloxypropyldimethylsilyl terminated polydimethylsiloxanes of similar degree of polymerization (DP). However, the latter compositions allow better working time and produce a lower modulus elastomer. Hence, combinations of component (i) having differing structures may be beneficial. Methods of preparing such organopolysiloxane fluids are known such as the hydrolysis and condensation of corresponding organohalosilanes or equilibration of cyclic polydiorganosiloxanes.

The symbols M, D, T, and Q used herein represent the functionality of structural units of polyorganosiloxanes including organosilicon fluids, resins, and cured products thereof. The symbols are used in accordance with established understanding in the silicone industry. M represents the monofunctional unit $R_3SiO_{1/2}$; D represents the difunctional unit $R_2SiO_{2/2}$; T represents the trifunctional unit $RSiO_{3/2}$; and Q represents the tetrafunctional unit $SiO_{4/2}$. The structural formula of these units is shown below.

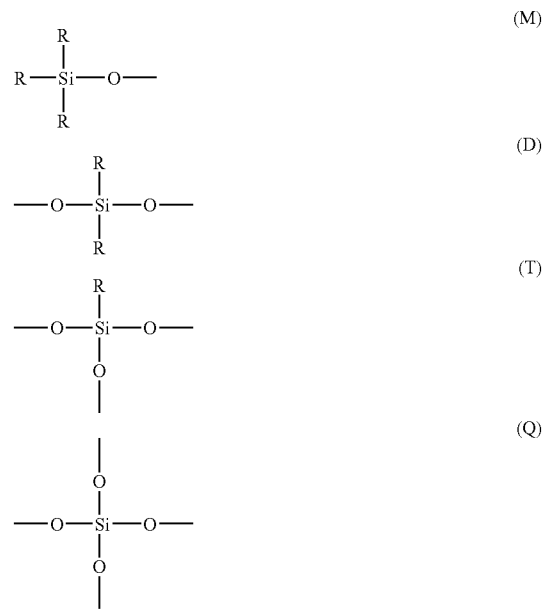

Component (i) may also be an organosiloxane resin such as MQ resins containing $R^5{}_3SiO_{1/2}$ units and $SiO_{4/2}$ units; TD resins containing $R^5SiO_{3/2}$ units and $R^5{}_2SiO_{2/2}$ units; MT resins containing $R^5_3SiO_{1/2}$ units and $R^5SiO_{3/2}$ units; MTD resins containing $R^5_3SiO_{1/2}$ units, $R^5SiO_{3/2}$ units, and $R^5_2SiO_{2/2}$ units, or combinations thereof.

Each $R^5$ group in these organosiloxane resins represents a monovalent organic group. The monovalent organic group $R^5$ can have 1-20 carbon atoms preferably 1-10 carbon atoms. Some examples of monovalent organic groups are acrylate functional groups such as acryloxyalkyl groups, methacrylate functional groups such as methacryloxyalkyl groups, cyano-functional groups, and monovalent hydrocarbon groups. Monovalent hydrocarbon groups include alkyl groups such as methyl, ethyl, propyl, pentyl, octyl, undecyl, and octadecyl groups; cycloalkyl groups such as cyclohexyl groups; alkenyl groups such as vinyl, allyl, butenyl, and hexenyl groups; alkynyl groups such as ethynyl, propynyl, and butynyl groups; aryl groups such as phenyl, tolyl, xylyl, benzyl, and 2-phenylethyl groups; halogenated hydrocarbon groups such as 3,3,3-trifluoropropyl, 3-chloropropyl, dichlorophenyl, and 6,6,6,5,5,4,4,3,3-nonafluorohexyl groups. The cyano-functional groups include cyanoalkyl groups such as cyanoethyl and cyanopropyl groups.

$R^5$ can also be an alkyloxypoly(oxyalkyene) group such as propyloxy(polyoxyethylene), propyloxypoly(oxypropylene) and propyloxy-poly(oxypropylene)-co-poly(oxyethylene) groups; halogen substituted alkyloxypoly(oxyalkyene) groups such as perfluoropropyloxy(polyoxyethylene), perfluoropropyloxypoly(oxypropylene) and perfluoropropyloxy-poly(oxypropylene) copoly(oxyethylene) groups; alkenyloxypoly(oxyalkyene) group such as allyloxypoly(oxyethylene), allyloxypoly(oxypropylene) and allyloxypoly(oxypropylene) copoly(oxyethylene) groups; alkoxy groups such as methoxy, ethoxy, n-propoxy, isopropoxy, n-butoxy and ethylhexyloxy groups; aminoalkyl groups such as aminomethyl, 2-aminoethyl, 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; hindered aminoalkyl groups such as tetramethylpiperidinyl oxypropyl groups; epoxyalkyl groups such as glycidoxymethyl, 3-glycidoxypropyl, 2-(3,4,-epoxycyclohexyl) ethyl, and 5,6-epoxyhexyl groups; ester functional groups such as acetoxymethyl and benzoyloxypropyl groups; hydroxyl functional groups such as hydroxy and 2-hydroxyethyl groups; isocyanate and masked isocyanate functional groups such as isocyanatomethyl, 3-isocyanatopropyl, tris-3-propylisocyanurate, propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; carbazole groups such as 3-(N-carbazolyl)propyl; arylamino-functional groups such as 4-(N,N-diphenylamino)phenyl-3-propyl; carboxylic acid functional groups such as 3-carboxypropyl, 2-carboxyethyl, and 10-carboxydecyl groups; and metal salts of carboxylic acids such as zinc, sodium, and potassium salts of 3-carboxypropyl and 2-carboxyethyl.

The organosiloxane resins generally contain an average of 1-40 mole percent of free radical polymerizable groups such as unsaturated organic groups. The unsaturated organic groups may be alkenyl groups, alkynyl groups, acrylate-functional groups, methacrylate-functional groups, or combinations thereof. Mole percent of unsaturated organic groups in organosiloxane resins as defined herein is the ratio of the number of moles of unsaturated group containing siloxane units in a resin to the total number of moles of siloxane units in the resin multiplied by 100.

Some specific examples of suitable organosiloxane resins that are useful as component (i) are $M^{Methacryloxymethyl}Q$ resins, $M^{Methacryloxypropyl}Q$ resins, $MT^{Methacryloxymethyl}T$ resins, $MT^{Methacryloxypropyl}T$ resins, $MDT^{Methacryloxymethyl}T^{Phenyl}T$ resins, $MDT^{Methacryloxypropyl}T^{Phenyl}T$ resins, $M^{Vinyl}T^{Phenyl}$ resins, $TT^{Methacryloxymethyl}$ resins, $TT^{Methacryloxypropyl}$ resins, $T^{Phenyl}T^{Methacryloxymethyl}$ resins, $T^{Phenyl}T^{Methacryloxypropyl}$ resins, $TT^{Phenyl}T^{Methacryloxymethyl}$ resins, and $TT^{Phenyl}T^{Methacryloxypropyl}$ resins, where M, D, T, and Q have the same meanings as defined above. If desired, $M^{Vinyl}T^{Phenyl}$ resins can also be used and are described in U.S. Pat. No. 6,509,423 (Jan. 21, 2003).

Methods of preparing organosiloxane resins are known. For example, the resins can be made by treating a resin copolymer produced by a silica hydrosol capping process as described in U.S. Pat. No. 2,676,182 (Apr. 20, 1954) with an alkenyl containing endblocking reagent. The method in the '182 patent in particular involves the reaction of a silica hydrosol under acidic conditions with a hydrolyzable triorganosilane such as trimethylchlorosilane, a siloxane such as hexamethyldisiloxane, or a mixture thereof, and then recovering a copolymer having M and Q units. These copolymers typically contain 2-5 percent by weight of hydroxyl groups.

Organosiloxane resins containing less than 2 percent by weight of silicon bonded hydroxyl groups may then be prepared by reacting the copolymeric product of the '182 patent with an endblocking agent containing unsaturated organic groups and an endblocking agent free of aliphatic unsaturation in amounts sufficient to provide 3-30 mole percent of unsaturated organic groups in the product. Suitable endblocking agents include silazanes, siloxanes, and silanes. Some preferred endblocking agents are described in U.S. Pat. No. 4,584,355 (Apr. 22, 1986), U.S. Pat. No. 4,585,836 (Apr. 29, 1986), and U.S. Pat. No. 4,591,622 (May 22, 1986). A single endblocking agent or mixture of endblocking agents may be used to prepare these organosiloxane resins.

Another type of organosilicon compound that can be used as component (i) is a composition formed by copolymerizing an organic compound having a polymeric backbone with an organopolysiloxane where an average of at least one free radical polymerizable group is incorporated per molecule. Suitable organic compounds include hydrocarbon based polymers such as polyisobutylene, polybutadienes, polyisoprenes; polyolefins such as polyethylene, polypropylene and polyethylene polypropylene copolymers; polystyrenes, styrene butadiene, and acrylonitrile butadiene styrene; polyacrylates; polyethers such as polyethylene oxide or polypropyleneoxide; polyesters such as polyethylene terephthalate or polybutylene terephthalate; polyamides; polycarbonates; polyimides; polyureas; polymethacrylates; and partially fluorinated or perfluorinated polymers such as polytetrafluoroethylene; fluorinated rubbers; terminally unsaturated hydrocarbons, olefins and polyolefins. The organic compound can also be a copolymer of any of the above compounds including polymers containing multiple organic functionality, multiple organopolysiloxane functionality, or combinations of organopolysiloxanes with organic compounds. The copolymeric structures can vary in their arrangement of repeating units from random, grafted, or blocky in nature.

In addition to bearing an average of at least one free radical polymerizable group, component (i) can have a physical transition temperature or bear an organofunctional group with a physical transition temperature, or upon curing form a matrix that has a physical transition temperature, i.e., glass transition or melting transition, such that the composition undergoes changes marked by softening or non-linear reduction in viscosity on reaching certain temperatures under conditions of use. Such organopolysiloxane matrices are useful for phase change compositions such as those found to be useful in thermally conductive phase change thermal interface materials for electronic components. A suitable organopolysiloxane matrice is an organofunctional silicone wax. The wax can be an uncrosslinked organofunctional silicone wax, a crosslinked organofunctional silicone wax, or combinations of such waxes. These silicone waxes are commercially available and are described in detail in U.S. Pat. No. 5,380,527 (Jan. 10, 1995); U.S. Pat. No. 6,121,165 (Sep. 19, 2000); and in U.S. Pat. No. 6,620,515 (Sep. 16, 2003). Organofunctional silicone waxes also bearing at least one free radical polymerizable group such as acrylate or methacrylate are useful to impart phase changes to the composition when used as component (i).

The Organoborane Amine Complex (ii)

The organoborane amine complex (ii) is a complex formed between an organoborane, and a suitable amine compound that renders the complex stable at ambient conditions. The complex (ii) should be capable of initiating polymerization or crosslinking of component (i) by the introduction of an amine reactive compound and/or by heating. An example is an alkylborane amine complex formed from trialkylboranes and various amine compounds. Examples of trialkylboranes useful for forming component (ii) include trialkylboranes of the formula BR"$_3$ where R" represents linear and branched aliphatic or aromatic hydrocarbon groups containing 1-20 carbon atoms. Some examples include triethylborane, tri-n-butylborane, tri-n-octylborane, tri-sec-butylborane, tridodecylborane, and phenyldiethylborane.

Some examples of amine compounds useful to form the organoborane amine complex (ii) with the organoborane compounds include 1,3 propane diamine, 1,6-hexanediamine, methoxypropylamine, pyridine, and isophorone diamine. Other examples of amine compounds useful to form organoborane amine complexes are described in the '512 patent referred to above, as well as in U.S. Pat. No. 6,806,330 (Oct. 19, 2004).

Silicon containing amine compounds can also be used to form the organoborane amine complex including compositions such as aminomethyltrimethoxysilane, 3-aminopropyltrimethoxysilane, aminomethyltriethoxysilane, 3-aminopropyltriethoxysilane, 2-(trimethoxysilylethyl)pyridine, aminopropylsilanetriol, 3-(m-aminophenoxy)propyltrimethoxysilane, 3-aminopropyldiisopropylmethoxysilane, aminophenyltrimethoxysilane, 3-aminopropyltris(methoxyethoxy)silane, N-(2-aminoethyl)aminomethyltrimethoxysilane, N-(2-aminoethyl)-3-aminopropyltrimethoxysilane, N-(6-aminohexyl)aminomethyltrimethoxysilane, N-(2-aminoethyl)-11-aminoundecyltrimethoxysilane, (aminoethylaminomethyl)phenethyltrimethoxysilane, N-(2-aminoethyl)-3-aminopropylmethyldimethoxysilane, N-(2-aminoethyl)-3-aminoisobutylmethyldimethoxysilane, (3-trimethoxysilylpropyl)diethylene-triamine, and 1,1,2,4-tetramethyl-1-sila-2-azacyclopentane.

Amine functional organopolysiloxanes are also useful for forming the organoborane amine complex (ii) including compounds described above in formulas (a) and (b), and those compounds described previously as organopolysiloxane resins. This is subject to the stipulation that the molecule contain at least one amine functional group, such as aminomethyl, 2-aminoethyl, 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole.

Specific examples include terminal and/or pendant amine-functional polydimethylsiloxane oligomers and polymers, terminal and/or pendant amine-functional random, graft and block copolymers and co-oligomers of polydimethylsiloxane and poly(3,3,3 trifluoropropyl-methylsiloxane), terminal and/or pendant amine-functional random, graft and block copolymers and co-oligomers of polydimethylsiloxane and poly(6,6,6,5,5,4,4,3,3-nonfluorohexyl-methylsiloxane), and terminal and/or pendant amine-functional random, graft and block copolymers and co-oligomers of polydimethylsiloxane and polyphenymethylsiloxane. Other examples of useful compounds include resinous amine-functional siloxanes such as the amine-functional compounds described previously as organopolysiloxane resins.

Also useful to form the organoborane amine complex (ii) are other nitrogen containing compounds including N-(3-triethyoxysilylpropyl)-4,5-dihydroimidazole, ureidopropyltriethoxysilane, siloxanes of formulas similar to formulas (a) and (b) noted above, and those compounds described previously as organopolysiloxane resins in which at least one group is an imidazole, amidine, or ureido functional group. When the amine compound is polymeric, the molecular weight is not limited, except that it should be such as to maintain a sufficiently high concentration of boron to permit curing or polymerization of the composition. For example, in a two-part composition, the part containing the organoborane initiator may be diluted with other components of the composition, or it may consist of the initiator complex alone.

If desired, the curable composition may be stabilized by physically or chemically attaching the organoborane amine complex to solid particles. This provides a way to control working times, as well as to stabilize liquid phase organoborane amine complexes against separating from the rest of the composition during storage. For example, chemical attachment can be performed by pretreating solid particles such as ground silica, precipitated silica, calcium carbonate, or barium sulfate, with a condensation reactive compound containing an amine group such as aminopropyltrimethoxysilane. The pretreatment is followed by complexation with an organoborane compound, or by the direct treatment of the solid particles using a preformed organoborane amine complex that is condensation reactive. When the solid particles contain surface functional groups, additives such as surface treating agents or impurities that are inherently amine reactive, require appropriate pre-cautions to avoid premature decomplexation of the organoborane amine complex being attached. Solid particles containing amine reactive substances can be purified or neutralized before attachment of the organoborane amine complex. Alternatively, the attachment of the organoborane amine complex can be performed in an oxygen free environment.

The Amine Reactive Compound Having Amine Reactive Groups (iii)

The curable composition may contain an amine reactive compound (iii) that is capable of initiating the polymerization, or crosslinking, when mixed with the organoborane amine complex (ii) and exposed to an oxygenated environment. The amine reactive compound may be a liquid, gas, or solid. The amine reactive compound may be a small molecule, a monomer, an oligomer, a polymer, or a mixture thereof, may also be diluted or borne by a carrier such as an aqueous or non-aqueous solvent, or by a filler particle. The amine reactive compound may contain free radical polymerizable groups or other functional groups such as a hydrolyzable group. The amine reactive groups on the amine reactive compound may be borne on an organic, organosilicon, or organopolysiloxane compound. The presence of component (iii) allows the initiation of polymerization or crosslinking to occur at temperatures below the dissociation temperature of the organoborane amine complex (ii) including room temperature and below. To achieve storage stability in the presence of oxygen, it is preferred that components (ii) and (iii) be physically or chemically isolated. For example, a composition containing component (iii) can be rendered air stable by packaging it separately from component (ii) as a multi-component formulation. Alternatively, components (ii) and (iii) or both can be encapsulated, or delivered in separate phases. This can be accomplished by introducing one or both of components (ii) and (iii) in a solid form that prevents intimate mixing of components (ii) and (iii). Curing of the composition can be activated by (a) heating it above the softening temperature of the solid phase component or encapsulant, or (b) by introduction of a solubilizing agent that allows mixing of components (ii) and (iii). Components (ii) and (iii) can also be combined in a single container without significant polymerization or crosslinking by packaging the two components in a container where mixing conditions are anaerobic.

Examples of some amine reactive compounds having amine reactive groups (iii) that can rapidly initiate polymerization or cure in the presence of oxygen include mineral acids, Lewis acids, carboxylic acids, carboxylic acid derivatives such as anhydrides and succinates, carboxylic acid metal salts, isocyanates, aldehydes, epoxides, acid chlorides, and sulphonyl chlorides. Some suitable amine reactive compounds include acrylic acid, methacrylic acid, polyacrylic acid, polymethacrylic acid, methacrylic anhydride, undecylenic acid, oleic acid, lauric acid, lauric anhydride, citraconic anhydride, ascorbic acid (Vitamin C), methylene bis-(4-cyclohexylisocyanate) monomers or oligomers, hexamethylene diisocyanate monomers or oligomers, toluene-2,4-diisocyanate monomers or oligomers, isophorone diisocyanate monomers or oligomers, methylene diphenyl isocyanate monomers or oligomers, methacryloylisocyanate, 2-(methacryloyloxy)ethyl acetoacetate, undecylenic aldehyde, and dodecyl succinic anhydride.

For improved compatibility in curable compositions herein containing organosiloxane matrices, it may be advantageous when the amine reactive compound is an organosilane or organopolysiloxane bearing amine reactive groups. Some examples include isocyanatomethyltrimethoxysilane; 3-isocyanatopropyltrimethoxysilane; 3-glycidoxypropyltrimethoxysilane; triethoxysilylpropyl succinic anhydride; propylsuccinic anhydride functionalized linear, branched, resinous, and hyperbranched organopolysiloxanes; methylsuccinic anhydride functionalized linear, branched, resinous, and hyperbranched organopolysiloxanes; cyclohexenyl anhydride functional linear, resinous, and hyperbranched organopolysiloxanes; carboxylic acid functionalized linear, branched, resinous, and hyperbranched organopolysiloxanes such as carboxydecyl terminated oligomeric or polymeric polydimethylsiloxanes; and aldehyde functionalized linear, branched, resinous, and hyperbranched organopolysiloxanes such as undecylenic aldehyde-terminated oligomeric or polymeric polydimethylsiloxanes. The '512 patent describes silicon containing compounds that can be used including certain compounds that release an acid when exposed to moisture. The '512 patent also describes other amine reactive compounds referred to as decomplexation agents.

Other compounds that can be used include compounds capable of generating amine reactive groups when exposed to ultraviolet radiation such as a photoacid generator. Examples of such compounds include iodonium salts containing [SbF$_6$]$^-$ counterions. In such an embodiment, it may be useful to optionally include a photosensitizing compound such as isopropylthioxanthone.

In some cases it may be desirable to stabilize the curable composition by attaching the amine reactive compound to solid particles. This enables one to control the working time and it stabilizes the liquid phase containing the amine reactive compound against separation from the rest of the curable composition during storage. Attachment can be accomplished by a number of known surface treatments either in-situ or a priori. Some surface treatment methods include for example pre-treating solid particles such as ground or precipitated silica, calcium carbonate, carbon black, carbon nanoparticles, silicon nanoparticles, barium sulfate, titanium dioxide, aluminum oxide, zinc oxide, boron nitride, silver, gold, platinum, palladium, and alloys thereof; or a base metal such as nickel, aluminum, copper, and steel; with a condensation reactive compound. This is followed by reaction of the pre-treated solid particles with a compound having amine reactive groups, or by the direct treatment of the pre-treated solid particles using amine reactive compounds that have hydrolyzable moieties.

Some examples of condensation reactive compounds that can be used include isocyanatomethyltriethoxysilane, 3-isocyanatopropyltriethoxysilane, isocyanatomethyltrimethoxysilane, 3-isocyanatopropyltrimethoxysilane, isocyanatopropyltriethoxysilane, triethoxysilylundecanal, glycidoxymethyltrimethoxysilane, 3-glycidoxypropyltrimethoxysilane, (triethoxysilyl)methylsuccinic anhydride, 3-(triethoxysilyl)propylsuccinic anhydride, and 2-(4-chlorosulfonylphenyl) ethyltrimethoxysilane. Attachment of the amine reactive compound to the solid particles can also be accomplished by mixing an acid functional compound with fillers having the appropriate surface functionality under conditions conducive to formation of an acid base complex, a hydrogen bonded complex, or an acid salt.

Some fillers are commercially available and are already pre-treated with surface treating agents referred to as lubricants, or can be obtained with impurities that contain amine reactive groups such as carboxylic acid. In this way, component (iii) can be delivered together in the form of a treated filler. The advantage obtained in that instance is that the reaction between the organoborane amine complex and the amine reactive groups on the filler can help remove the lubricant from the surface of the filler particles.

Some representative and preferred examples of amine reactive groups useful (iii) include carboxylic acid, anhydride, isocyanate, aldehydes, and epoxies. Blocked isocyanates may be useful in cases where instead of ambient polymerization, it is desirable to use heat to initiate polymerization rapidly.

The Component Capable of Generating a Gas (iv)

Cured compositions herein can be prepared as porous foams by including a component capable of generating a gas upon mixing. Some means of accomplishing this include adding to the composition (1) a silicon hydride functional compound, (2) a compound bearing active hydrogen such as water, alcohols, or carboxylic acids, and (3) a co-catalyst such as platinum or tin to facilitate the reaction between the silicon hydride and the active hydrogen. This generates hydrogen gas during the curing step and a foam is generated upon mixing. The resulting foamed compositions range from flexible foams to rigid foams depending on the silicon hydride, active hydrogen, and free radical polymerizable compound, that was used. The pore size distribution of the foam can be controlled by any known methods of foam generation to achieve any desired property such as modulus, density, and permeability.

Optional Components

Some optional components that can be included in the curable compositions herein include adhesion promoters; crosslinking agents; combinations of polymers, crosslinking agents, and catalysts useful for providing a secondary cure of the matrix; polymers capable of extending, softening, reinforcing, toughening, modifying viscosity, or reducing volatility when mixed into the composition; extending and reinforcing fillers; conductive fillers, spacers; dyes; pigments; comonomers such as organic acrylates and organic methacrylates; UV stabilizers; aziridine stabilizers; void reducing agents; cure modifiers such as hydroquinone and hindered amines; free radical initiators such as organic peroxides and ozonides; polymers; diluents; rheology modifiers; acid acceptors; antioxidants; oxygen scavengers; oxygen sponges; oxygen release agents; oxygen generators; heat stabilizers; flame retardants; silylating agents; foam stabilizers; surfactants; wetting agents; solvents; diluents; plasticizers; fluxing agents; and dessicants.

Curable composition of the invention can be prepared by combining and mixing:

A. 1-50 parts by weight of a free radical polymerizable organosilicon monomer, oligomer or polymer (i);

B. 0.1-50 parts by weight of an organoborane amine complex (ii) sufficient to cure the composition, the amount depending on the molecular weight of the complex and the number of boron atoms per molecule;

C. 0 to 50 parts by weight of an amine reactive compound having amine reactive groups (iv) sufficient to decomplex boron depending on the molecular weight of the compound;

D. 0 to 50 parts by weight of a component capable of generating gas (v) when mixed with a compound bearing active hydrogen and a catalyst; and E. 0 to 50 parts by weight of any optional ingredient(s); based on the total weight of the curable composition.

The working time and extension of shelf stability of curable compositions of the invention can be controlled by introducing additional amine compounds to increase the molar ratio of amine groups to boron atoms in the composition. The effective amount to be added depends on the amine:boron ratio used in component (i). It is preferred that the overall amine:boron ratio remain sufficiently low however to permit polymerization to occur. A suitable amine:boron ratio would be less than 10:1, preferably less than 4:1. When the amine reactive component is already present in the curable composition, for example, when residual carboxylic acid is present on the filler particles, higher levels of amine compounds can be added to neutralize or partially neutralize the amine reactive groups for storage stability. The amine compound may contain monofunctional or multifunctional amine groups, and it can be a primary amine, a secondary amine, and/or a tertiary amine. If desired, the amine compound can contain free radical polymerizable groups or another functional group such as a hydrolyzable group. The amine compound can be monomeric, oligomeric, or polymeric in nature. Amine groups on the compound may be borne on an organic, organosilicon, or organopolysiloxane compound.

Composite articles according to the invention preferably comprise curable compositions that are disposed or applied to a single substrate or between multiple substrates. The substrate or substrates can be organic, thermoplastic, thermosetting, metallic, ceramic, or other suitable inorganic material. The substrates can be multi-layered substrates such as substrates used in printed circuit boards in which improved adhesion is desired between the curable compositions and the substrate or substrates of the composite article.

Composite articles are made by bonding the curable composition to at least one surface of the substrate in the composite article. This is carried out by curing the composition, and achieving sufficient adherence such that the curable composition and the substrate are bonded together securely to form the composite article.

For maximum benefit, the cure temperature should range from −40° C. to 80° C., preferably from 0° C. to 60° C., and more preferably from 15-35° C. The time for curing the composition on the substrate can range from 5 seconds to 24 hours, preferably 30 seconds to 2 hours. This will assure that the composition is sufficiently cured and fully adhered to the substrate. The curable composition can be applied to a substrate by meter mixing, extruding, and/or using robotic or manual application.

Fully bonded composite articles can be made by disposing the curable composition onto at least one surface of the polymeric substrate at a temperature less than the boiling point of water (100° C.), and then concurrently curing the curable composition and bonding it to the polymeric substrate(s). This obviates the need to pre-dry the substrate(s). Composite articles can also be cured and bonded in a similar fashion at room temperature that eliminates the need to use a curing oven.

As noted above, the curable compositions herein can be used easily as multiple-component multi-part adhesives. Combinations of components (i), (ii), (iii) and (iv) may be used as parts of multi-component multi-part packages provided components (ii) and (iii) are kept separate from one another. For example, a portion of the free radical polymerizable monomer, oligomer or polymer (i), and the organoborane amine complex (ii), can be packaged together in one part, while the remaining portion of the free radical polymerizable monomer, oligomer or polymer (i) and the amine reactive compound (iii) are packaged together in a second part. Components (i)-(iii) can also be stored together in a 1-part formulation as long as oxygen is not present. In one part formulations, it is beneficial to mix, package, and store the components in a substantially oxygen free environment to avoid premature thickening.

In the embodiment where the amine-reactive compound (iii) is borne on a filler and all the components are combined into a single package, it is necessary to mix, package, and store components (i), (ii) and (iii), in a substantially oxygen free environment, to avoid premature thickening. In two part formulations, it may also be advantageous for the sake of stability to use a combination of fillers containing amine reactive groups, and fillers that are inert with respect to amine compounds. For example, in a two part formulation, the filler that is inert with respect to amine compounds can be combined with the alkylborane amine complex (ii), while the filler bearing amine reactive groups can be packaged in a separate container from component (ii). In that case, component (i) could be included with either part of the formulation or with both parts. Alternatively, the amine reactive compound (iii) can be introduced under conditions that allow it to be delivered in the gas phase to a pre-mixed mold filled with a composition containing components (i) and (ii). This allows extended working time followed by rapid cure upon exposure to air.

When the curable composition is to be used as a foam, it is desirable to isolate the blowing agent, the catalyst, or the component capable of generating a gas from one another. The judicious positioning of these components in multi-part packages provides improved storage stability.

Mixing and dispensing of multi-component compositions can be carried out in several ways. For example, the compositions can be mixed at the desired volume ratio in air in a bag or through a pressurized gun. The '512 patent describes several devices capable of mixing and dispensing two-part compositions. It is beneficial to tailor the viscosity and density of two-part compositions to allow for their efficient mixing and dispensing. Fillers of varying density and viscosity modifiers such as solvents, monomers, and polymers can be used to impart control of these properties. It is also beneficial to exclude oxygen from the environment in the mixing device before dispensing it on a substrate to minimize pre-mature curing and plugging of the mixing and dispensing device. While there is no restriction on the mixing ratio between the components in multi-component formulations, it is generally preferred to maintain volume ratios between 0.05:1 and 20:1, and more preferably between 0.1:1 and 10:1 for two-part packages.

The curable compositions of the invention are useful for preparing rubbers; tapes; adhesives; protective coatings; thin films; electronic components; photonic components; acoustic dampening components; thermoplastic and thermosetting monolithic molded parts such as toys or auto-body panels; sealants; foams; gaskets; seals; o-rings; connectors; and pressure sensitive adhesives. Depending the choice of materials, cured compositions may range in properties from compliant gels to rigid resins. These curable compositions are especially useful for preparing self-adherent silicone elastomers and gels. Silicone elastomers and gels have numerous applications including their use as die attachment adhesives, lid sealants, encapsulants, gaskets, o-rings, potting compounds, and as conformal coatings. Silicone elastomers of the invention are capable of releasing from metal molds while at the same time adhering selectively to polymeric surfaces. Accordingly, the silicone elastomers can be co-molded or over-molded with polymeric resins in forming integrally bonded parts, such as connectors and housings for electrical wiring or electronic circuits, and diving masks for scuba diving. Silicone adhesives are useful for bonding electronic components to flexible or rigid substrates.

EXAMPLES

The following examples are set forth in order to illustrate the invention in more detail. In these examples, where number or weight average molecular weights are provided, the values stated were determined by gel permeation chromatography (GPC) using tetrahydrofuran as the solvent, and calibrated with monodisperse polystyrene standards. The polydispersity indices for samples analyzed by GPC ranged from 1.4-2.2, unless specifically noted to be otherwise.

Example A

Cure Profiles

Rheological cure profiling was performed with a Rheometrics RDAII rheometer equipped with 25 mm parallel plates and a 2,000 gram-centimeter transducer. Samples were dispensed onto the lower plate immediately after mixing Part A and Part B of a given composition. The upper and lower plates were brought together to a known gap of between 1.0-1.5 mm before subjecting the sample to oscillatory shear experiments. Dynamic mechanical properties including the storage modulus (G') and the loss modulus (G") were measured at 25° C. in air at one percent strain with a frequency of 10 rad/second. After 60 minutes, all samples showed fairly stable properties, so a dynamic strain sweep was performed at 10 rad/second, followed by a dynamic frequency sweep at one percent strain, well within the regime of linear viscoelasticity. The times at which G' reached 50 percent and 90 percent of the plateau G' measured after 60 minutes at 25° C., were defined as $T_{50}$ and $T_{90}$, respectively, as an indication of the cure rate.

Comparative Example 1

A first mixture (Part A) was prepared by adding 4 parts by weight of a catalyst consisting of tri-n-butyl borane complexed with 1.3 molar equivalents of isophorone diamine, to 46 parts by weight of a 44,000 number average molecular weight hydroxy dimethylsilyl-terminated polydimethylsiloxane (PDMS), and homogenizing the mixture with a Hauschild mixer for 10 seconds. In a second container, (Part B) was prepared by combining 3 parts by weight of a treated fumed silica filler, i.e., Cab-O-Sil® TS610 of Cabot Corporation, Boston, Mass., 39 parts by weight of methyl methacrylate, 3 parts by weight of isophorone diisocyanate, and 5 parts by weight of 3-methacryloxypropyl trimethoxysilane. Equal weights of Parts A and B were then mixed together in a Hauschild mixer for 10 seconds, exposed to air, and allowed to cure. The material hardened within 30 minutes, but yielded a flaky powder that had very poor mechanical strength. The mixture was also cast into three lap shear adhesion test joints using 30 percent glass-reinforced polypropylene substrates with bondline dimensions of 1×0.5×0.02 inches. The lap shear specimens were allowed to cure overnight at 24±2° C. and then tested. The composition failed cohesively at less than 25 pounds per square inch (psi) stress, further confirming that the material was incompletely cured. This composition is similar to those represented in the Examples of the '512 patent for the hydroxy-terminated organosilicon phase. It is modeled as closely as possible to Example 7 of the '512 patent, but omits the tin condensation cure catalyst for the organosilicon phase.

Comparative Example 2

A first mixture (Part A) was prepared by adding 3 parts by weight of a catalyst consisting of tri-n-butyl borane complexed with 1.3 molar equivalents of isophorone diamine, 11 parts by weight of hollow glass spheres, i.e., VS 5500 from 3M Corporation, Minneapolis, Minn., 3 parts by weight of a dimethylhydridosilyl-terminated poly(dimethylsiloxane-co-methylhydridosiloxane) having a number average molecular weight of 2,600 gram/mol and containing 26 mol percent of methylhydridosiloxane units; to 33 parts by weight of a 1000 cP vinyldimethylsiloxy-terminated PDMS, and homogenizing the mixture with a Hauschild mixer for 10 seconds. In a second container, Part B was prepared by combining 5.5 parts by weight of a treated fumed silica filler (Cab-O-Sil® TS530), 41.5 parts by weight of methyl methacrylate, and 3 parts by weight of isophorone diisocyanate. Equal weights of Part A and Part B were then mixed together in a Hauschild mixer for 10 seconds, exposed to air, and allowed to cure. The material hardened within 60 minutes, but yielded a powdery paste that had very poor mechanical strength. The mixture was also cast into three lap shear adhesion test joints using 30 percent glass-reinforced polypropylene substrates with bondline dimensions of 1×0.5×0.02 inches. The lap shear specimens were allowed to cure overnight at 24±2° C. and then tested. The composition failed cohesively at less than 65 psi stress, further confirming that the material was incompletely cured. This composition is similar to those represented in the Examples of the '512 patent for the hydroxy-terminated organosilicon phase. It was modeled as closely as possible to Example 57 of the '512 patent, but deliberately omits the platinum condensation cure catalyst for the organosilicon phase.

Comparative Example 1 and Comparative Example 2 show that compositions similar to those of the '512 patent suffer from incomplete cure, unless a separate catalyst for the organosilicon phase is added, regardless of whether the organosilicon phase is cured by condensation or addition.

Example B

Procedure

The following general procedure was used in conducting Examples 1-10. In a first container that was a glass vial or polypropylene mixing cup, 1.5 parts by weight of a free radical polymerizable organosilicon monomer, oligomer, or polymer (organosilicon compound) was combined with 0.05 parts by weight of a catalyst consisting of tri-n-butyl borane complexed with 1.3 molar equivalents of methoxypropyl amine (hereinafter referred to as TnBB-MOPA) using a Hauschild mixer for at least 10 seconds. In a second similar container, 1.5 parts by weight of the organosilicon compound was combined with 0.04 parts by weight of isophorone diisocyanate. Equal weights of the contents of each container were combined in a third glass vial or polypropylene mixing cup under a nitrogen purge, and then mixed together for 10 seconds in a Hauschild mixer. The screw top container cap was then removed to expose the mixture to air, and curing was monitored by probing the composition manually with a metal spatula. The results are shown in Table 1.

Example 1

The organosilicon compound was a methacryloxypropyl dimethylsilyl-terminated PDMS having a number average molecular weight of 56,600 gram/mol. The average nominal structure is represented by the formula M'D$_{760}$M', where M' or T' hereafter denote the mono-substituted methacryloxypropyl functional species of M or T units.

Example 2

The organosilicon compound was dimethacryloxypropyl tetramethyldisiloxane M'M'.

Example 3

The organosilicon compound was 3-methacryloxypropyl-trimethoxysilane.

Example 4

The organosilicon compound was an organopolysiloxane resin having the nominal average structure represented by the formula M'$_{0.67}$Q$_{0.33}$ and a number average molecular weight of 1,140 gram/mol.

Example 5

The organosilicon compound was an organopolysiloxane resin having the nominal average structure represented by the formula T$_{0.25}$T'$_{0.75}$ having a number average molecular weight of 3,670 gram/mol and a weight average molecular weight of 38,200.

Example 6

The organosilicon compound was an organopolysiloxane resin having the nominal average structure represented by the formula T$_{0.7}$T'$_{0.3}$ and a number average molecular weight of 2,180 gram/mol.

Example 7

The organosilicon compound was an organopolysiloxane resin having the nominal average structure represented by the formula M$_{0.3}$D$^{Phenyl}_{0.5}$T'$_{0.3}$ having a number average molecular weight of 745 gram/mol.

Example 8

The organosilicon compound was an organopolysiloxane resin having the nominal average structure represented by the formula M$_{0.2}$D$_{0.2}$T$_{0.3}$T'$_{0.3}$ having a number average molecular weight of 1,330 gram/mol.

Example 9

The organosilicon compound was an organopolysiloxane resin having the nominal average structure M$_{0.3}$T$^{Phenyl}_{0.5}$T'$_{0.3}$ and a number average molecular weight of 1,100 gram/mol.

Example 10

The organosilicon compound was a tetrafunctional telechelic organopolysiloxane synthesized by the Michael Addition reaction of 2 molar equivalents of trimethylolpropane triacrylate with one molar equivalent of N-(methyl)isobutyldimethylsilyl-terminated PDMS having a number average molecular weight of 4,300 gram/mol. The reaction was carried out by stirring the reactants at 23±3° C. in a continuously dry nitrogen purged glass vial. The secondary amine-terminated PDMS was prepared by adding 2.2 molar equivalents of 1,1,2,4-tetramethyl-1-sila-2-azacyclopentane to one molar equivalent of a hydroxydimethyl terminated PDMS having a number average molecular weight of 4,200 gram/mol in a dry 3-neck flask equipped with a thermometer, a nitrogen line, a water condenser, a magnetic stirring bar, and a liquid nitrogen trap for recovering any volatile materials. The reaction was carried at 80° C. for 60 minutes under a continuous dry nitrogen purge, and then subjected to a reduced pressure of 4 Torr to remove excess of 1,1,2,4-tetramethyl-1-sila-2-azacyclopentane.

Table 1 showing the results of Examples 1-10 indicates that a broad range of free radical polymerizable organosilicon monomers, oligomers, and polymers can be cured rapidly in compositions according to the invention to various physical forms without requiring a separate cure catalyst for the organosilicon phase. In contrast, the compositions of Comparative Example 1 and Comparative Example 2 fail to cure properly in the absence of a separate cure catalyst for the organosilicon phase.

TABLE 1

| Example | Ambient Time to Gelation | Description of Cured Material |
| --- | --- | --- |
| Comparative Example 1 | 30 minutes | Not fully cured, flaky powder |
| Comparative Example 2 | 1 hour | Not fully cured, granular paste. |
| Example 1 | Less than 10 minutes | Translucent soft elastomer |
| Example 2 | Less than 5 minutes | Clear, glassy solid |
| Example 3 | Less than 10 minutes | Translucent, glassy solid |
| Example 4 | 1 minute | Clear, glassy solid |
| Example 5 | 5 minutes | Clear, glassy solid |
| Example 6 | 1 minute | Clear, glassy solid |
| Example 7 | 30 seconds | Clear, glassy solid |
| Example 8 | 30 seconds | Clear, glassy solid |
| Example 9 | 30 seconds | Clear, glassy solid |
| Example 10 | Less than 5 seconds | Translucent, hard elastomer |

Part A and Part B of the 2-part compositions in the remaining Examples and Comparative Examples were individually prepared in separate polypropylene mixing cups by mixing for 10 seconds in a Hauschild mixer after addition of each of the components. Equal weights of Part A and Part B were then hand mixed in a polyethylene bag to initiate curing. The compositions used in Comparative Examples 3-4 and Examples 11-16 were prepared and tested according to the procedure described in Example A. The results are shown in Table 2.

Comparative Example 3

Part A contained 96.6 parts by weight of a vinyldimethylsiloxy terminated PDMS having a number average molecular weight of 12,000 gram/mol, and 3.4 parts by weight of a poly(methylhydrogen)siloxane having a number average molecular weight of 4,100 gram/mol. Part B contained 99.8 parts by weight of a vinyldimethylsiloxy terminated PDMS having a number average molecular weight of 12,000 gram/mol, and 0.2 parts by weight of a hydrosilylation catalyst with a concentration of 0.1 M of $Pt^0$ divinyltetramethyldisiloxane in a vinyldimethylsiloxy terminated PDMS.

Comparative Example 4

Part A contained 99.3 parts by weight of a vinyldimethylsiloxy terminated PDMS having a number average molecular weight of 59,400 gram/mol, and 0.7 parts by weight of a poly(methylhydrogen)siloxane having a number average molecular weight of 4,100 gram/mol. Part B contained 99.8 parts by weight of a vinyldimethylsiloxy terminated PDMS having a number average molecular weight of 59,400 gram/mol, and 0.2 parts by weight of a hydrosilylation catalyst with a concentration of 0.1 M $Pt^0$ divinyltetramethyldisiloxane in vinyldimethylsiloxy terminated PDMS.

Example 11

Part A contained 85.0 parts by weight of a methacryloxypropyl dimethylsilyl terminated PDMS having a number average molecular weight of 12,800 gram/mol referred to hereafter as MA-PDMS(12.8), 5.8 parts by weight of methoxypropylamine, and 9.2 parts by weight of TnBB-MOPA. Part B contained 67 parts by weight of MA-PDMS(12.8), and 33 parts by weight of a succinic anhydride terminated PDMS having a number average molecular weight of 700 gram/mol hereafter referred to as SA-PDMS.

Example 12

Part A contained 90.2 parts by weight of a methacryloxypropyl dimethylsilyl terminated PDMS having a number average molecular weight of 48,000 gram/mol referred to hereafter as MA-PDMS(48), and 9.8 parts by weight of TnBB-MOPA. Part B contained 59.4 parts by weight of MA-PDMS(48) and 40.6 parts by weight of SA-PDMS.

Example 13

A Polymer-Filler Blend 1 was prepared by combining 85 parts by weight of MA-PDMS(12.8) with 15 parts by weight of a treated fumed silica filler (Cab-O-Sil® TS530). Part A contained 87.0 parts by weight of Polymer-Filler Blend 1, 5.0 parts by weight of methoxypropylamine, and 8.0 parts by weight of TnBB-MOPA. Part B contained 63.2 parts by weight of Polymer-Filler Blend 1 and 36.8 parts by weight of SA-PDMS.

Example 14

Polymer-Filler Blend 2 was made by combining 85 parts by weight of MA-PDMS(48) with 15 parts by weight of a treated fumed silica filler (Cab-O-Sil® TS530). Part A contained 87.0 parts by weight of Polymer-Filler Blend 2, 5.0 parts by weight of methoxypropylamine, and 8.0 parts by weight of TnBB-MOPA. Part B contained 63.2 parts by weight of Polymer-Filler Blend 2 and 36.8 parts by weight of SA-PDMS.

Example 15

Part A contained 73.5 parts by weight of MA-PDMS(12.8), 2.5 parts by weight of methoxypropylamine, and 4.0 parts by weight of TnBB-MOPA. Part B contained 28.1 parts by weight of an $M^{Methacryloxypropyl}_{0.7}Q_{0.3}$ resin having a number average molecular weight of 1,140 gram/mol, 50.6 parts by weight of MA-PDMS(12.8), and 21.3 parts by weight of SA-PDMS.

Example 16

The composition in this example was the same as the composition in Example 15 except for the substitution of MA-PDMS(48) for MA-PDMS(12.8) at identical weight based concentrations in Part A and Part B.

TABLE 2

| Example | G' (Pa) | $T_{50}$ (minutes) | $T_{90}$ (minutes) |
| --- | --- | --- | --- |
| Comparative Example 3 | 4.2E+05 | 6.2 | 8.5 |
| Comparative Example 4 | 2.0E+05 | 8.7 | 12.8 |
| Example 11 | 5.9E+04 | 21.7 | 50.8 |
| Example 12 | 2.6E+04 | 21.6 | 51.0 |
| Example 13 | 2.9E+05 | 13.9 | 44.2 |
| Example 14 | 1.4E+05 | 8.8 | 42.7 |
| Example 15 | 5.7E+05 | 9.0 | 46.6 |
| Example 16 | 1.8E+05 | 8.3 | 46.1 |

Examples 11-16 show that the compositions according to the invention containing several different types of organopolysiloxanes and mixtures thereof, cure into elastomers covering a range of moduli, similar to that of hydrosilylation cured materials of comparable molecular weight. The $T_{50}$ and $T_{90}$ values show that compositions of this invention cure rapidly in ambient air, relative to known condensation cure silicone compositions. Examples 13 and 14 in particular illustrate that fillers may be used to modify these compositions without negatively affecting their cure properties. While the platinum catalyzed compositions in Comparative Example 3 and in Comparative Example 4 cure rapidly in these conditions, they are still be subject to cure inhibition problems in the presence of nitrogen, sulfur, tin, phosphorous, or arsenic compounds, at levels that would not negatively affect compositions according to the invention.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A composition comprising (i) a free radical polymerizable organosilicon monomer, oligomer or polymer; (ii) an organoborane amine complex; and optionally (iii) an amine reactive compound; the composition being free of any free radical polymerizable monomer, oligomer, or polymer, that does not contain one or more silicon atoms.

2. A composition according to claim 1 wherein the free radical polymerizable organosilicon monomer, oligomer, or polymer is (a) an organosilicon monomer, oligomer, or polymer or (b) a mixture of monofuntional or multifunctional organosilanes, or monofunctional or multifunctional organopolysiloxanes, in which (a) and (b) are unsaturated and capable of undergoing free radical polymerization.

3. A composition according to claim 1 wherein the organoborane amine complex (ii) is a complex formed between an organoborane and an amine compound, the organoborane having the formula B—R"$_3$ where R" is a linear, branched, aliphatic, or aromatic hydrocarbon group containing 1-20 carbon atoms; and wherein the amine compound is an organic amine compound or a silicon containing amine compound.

4. A composition according to claim 1 wherein the organoborane amine complex is attached to solid particles.

5. A composition according to claim 1 wherein the amine reactive compound is a compound having amine reactive groups and is selected from the group consisting of mineral acids, Lewis acids, carboxylic acids, carboxylic acid derivatives, carboxylic acid metal salts, isocyanates, aldehydes, epoxides, acid chlorides, and sulphonyl chlorides.

6. A composition according to claim 5 wherein the amine reactive groups are borne by an organosilane, an organopolysiloxane, an organotitanate, or an organozirconate.

7. A composition according to claim 5 wherein the amine reactive compound is attached to solid particles.

8. A composition according to claim 1 wherein the amine reactive compound is a compound capable of generating amine reactive groups when exposed to ultraviolet radiation.

9. A composition according to claim 8 wherein the composition further comprises a photosensitizing compound.

10. A composition according to claim 1 further comprising (iv) a component capable of generating a gas when mixed with a compound bearing active hydrogen and a catalyst, the component (iv) being a silicon hydride functional compound; the compound bearing active hydrogen being water, an alcohol, or a carboxylic acid; and the catalyst being platinum, a platinum group metal, tin, titanium, or zirconium.

11. A composition according to claim 1 wherein the organoborane amine complex is packaged separately from the amine reactive compound.

12. A composition according to claim 1 wherein the free radical polymerizable organosilicon monomer, oligomer or polymer, the organoborane amine complex, and the amine reactive compound are packaged together in one part in a substantially oxygen free environment.

13. A composition according to claim 1 wherein the free radical polymerizable organosilicon monomer, oligomer or polymer and the organoborane amine complex are packaged together in one part.

14. A composite article of manufacture comprising a substrate coated with the composition according to claim 1.

15. A composite article of manufacture according to claim 14 wherein the composition on the substrate is cured.

16. A composite article of manufacture comprising two or more substrates coated with the composition according to claim 1, and the composition is disposed between the substrates as a bond line of a fixed or a varying thickness.

17. A composite article of manufacture according to claim 16 wherein the composition disposed between the substrates is cured.

18. A rubber, tape, adhesive, foam, pressure sensitive adhesive, protective coating, thin film, electronic component, photonic component, acoustic dampening component, thermoplastic monolithic molded part, thermosetting monolithic molded part, sealant, gasket, seal, O-ring, or connector, comprising the cured product of the composition according to claim 1.

19. A rubber, tape, adhesive, foam, pressure sensitive adhesive, protective coating, thin film, electronic component, photonic component, acoustic dampening component, thermoplastic monolithic molded part, thermosetting monolithic molded part, sealant, gasket, seal, O-ring, or connector according to claim 18, comprising a silicone rubber, silicone tape, silicone adhesive, silicone foam, silicone pressure sensitive adhesive, silicone protective coating, silicone thin film, silicone electronic component, silicone photonic component, silicone acoustic dampening component, silicone thermoplastic monolithic molded part, silicone thermosetting monolithic molded part, silicone sealant, silicone gasket, silicone seal, silicone o-ring, or silicone connector.

20. A method of curing the composition according to claim 1 comprising applying the composition to a substrate, between multiple substrates, or to a mold; and exposing the composition to the amine reactive compound in the gas phase.

21. A method according to claim 20 wherein the amine reactive compound is a compound capable of generating amine reactive groups when exposed to ultraviolet radiation.

22. A method according to claim 20 wherein the composition further comprises a photosensitizing compound.

* * * * *